US012380758B2

(12) United States Patent
Ozaki et al.

(10) Patent No.: US 12,380,758 B2
(45) Date of Patent: Aug. 5, 2025

(54) GAMING DEVICE DISPLAY SYSTEMS, GAMING DEVICES AND METHODS FOR PROVIDING LIGHTING ENHANCEMENTS TO GAMING DEVICES

(71) Applicant: Interblock D.O.O., Las Vegas, NV (US)

(72) Inventors: Shun Ozaki, Tokyo (JP); Masumi Sakamoto, Tokyo (JP); Yoko Aikawa, Tokyo (JP); Satoshi Joko, Tokyo (JP)

(73) Assignee: INTERBLOCK D.O.O., Las Vegas, NV (US)

( * ) Notice: Subject to any disclaimer, the term of this patent is extended or adjusted under 35 U.S.C. 154(b) by 885 days.

(21) Appl. No.: 17/317,356

(22) Filed: May 11, 2021

(65) Prior Publication Data

US 2021/0264722 A1 Aug. 26, 2021

Related U.S. Application Data

(62) Division of application No. 16/591,054, filed on Oct. 2, 2019, now Pat. No. 11,037,395.

(60) Provisional application No. 62/741,925, filed on Oct. 5, 2018.

(51) Int. Cl.
*G07F 17/00* (2006.01)
*G07F 17/32* (2006.01)

(52) U.S. Cl.
CPC ...... *G07F 17/3211* (2013.01); *G07F 17/3216* (2013.01)

(58) Field of Classification Search
None
See application file for complete search history.

(56) References Cited

U.S. PATENT DOCUMENTS

| | | | | | |
|---|---|---|---|---|---|
| 4,107,767 | A * | 8/1978 | Anquetin | F21V 21/08 | 362/306 |
| 4,173,035 | A * | 10/1979 | Hoyt | H05B 45/30 | 40/594 |
| 4,177,503 | A * | 12/1979 | Anquetin | B25J 1/02 | 362/249.14 |
| 4,439,818 | A * | 3/1984 | Scheib | H05K 1/189 | 40/550 |
| 6,186,645 | B1 * | 2/2001 | Camarota | F21S 8/032 | 362/240 |
| 6,592,238 | B2 * | 7/2003 | Cleaver | F21V 5/00 | 362/267 |
| 6,776,504 | B2 * | 8/2004 | Sloan | F21V 21/005 | 362/240 |

(Continued)

OTHER PUBLICATIONS

United States Non-Final Office action dated Dec. 16, 2020 for U.S. Appl. No. 16/591,054.

*Primary Examiner* — Paul A D'Agostino
(74) *Attorney, Agent, or Firm* — BakerHostetler

(57) ABSTRACT

Gaming devices, gaming systems, gaming device display systems and methods for providing enhanced lighting features in gaming devices and systems are provided. In one example, a front or player-facing flexible LED light strip is positioned to follow a curved contour portion of a video display device. A diffuser may be positioned to cover the flexible LED light strip. The flexible LED light strip may be positioned on a display frame attached to the video display device and the display frame may include a curved contour portion that conforms to the curved contour portion of the display device.

13 Claims, 9 Drawing Sheets

(56) References Cited

U.S. PATENT DOCUMENTS 7,213,941 B2 * 5/2007 Sloan .................... F21V 21/005 362/240
7,396,282 B2 * 7/2008 Gauselmann ....... G07F 17/3211 463/30
8,430,756 B2 * 4/2013 McComb ............ G07F 17/3216 463/31
10,163,297 B1 * 12/2018 Bosak ................. G07F 17/3269
2006/0002110 A1 * 1/2006 Dowling ............... F21V 23/005 362/249.05
2006/0094511 A1 * 5/2006 Roireau .............. G07F 17/3202 463/46
2007/0159820 A1 * 7/2007 Crandell ................ A47B 97/00 362/249.01
2007/0171640 A1 * 7/2007 Sloan .................... F21V 21/088 362/240
2007/0202947 A1 * 8/2007 Seelig ................. G07F 17/3211 463/20
2007/0287528 A1 * 12/2007 Hirato ................. G07F 17/3216 463/20
2007/0287544 A1 * 12/2007 Hirato ................. G07F 17/3216 463/46
2008/0119288 A1 * 5/2008 Rasmussen ............. G07F 17/32 463/46
2009/0075721 A1 * 3/2009 Pacey ................. G07F 17/3211 463/20
2014/0287840 A1 * 9/2014 McComb ............ G07F 17/3216 463/46
2014/0295948 A1 * 10/2014 Helgesen .............. G07F 17/322 463/25
2015/0087420 A1 * 3/2015 Oehlert ................... A63F 13/90 463/36
2015/0301781 A1 * 10/2015 Ekkaia ...................... F21S 8/03 362/237
2015/0323826 A1 * 11/2015 Hsiao ................ G02F 1/133553 349/58
2015/0351227 A1 * 12/2015 Hasegawa .............. H05K 1/024 174/262
2015/0371486 A1 * 12/2015 Castro ................. G07F 17/3211 463/31
2016/0093142 A1 * 3/2016 Lamb .................. G07F 17/3213 463/20
2016/0121213 A1 * 5/2016 Choi ..................... A63F 13/803 463/31
2016/0184700 A1 * 6/2016 Lee ....................... G06F 3/1423 463/31
2016/0256785 A1 * 9/2016 Sum .................... G07F 17/3202
2016/0364946 A1 * 12/2016 Castro .................... G02B 5/021
2018/0025585 A1 * 1/2018 Schmidt .............. G07F 17/3211 463/20
2022/0139159 A1 * 5/2022 Whelan ............... G07F 17/3216 463/31

* cited by examiner

GAMING DEVICE DISPLAY SYSTEMS, GAMING DEVICES AND METHODS FOR PROVIDING LIGHTING ENHANCEMENTS TO GAMING DEVICES

CROSS-REFERENCE TO RELATED APPLICATIONS

This is a divisional application of U.S. patent application Ser. No. 16/591,054, filed Oct. 2, 2019, which claims the benefit of U.S. Provisional Application No. 62/741,925 filed Oct. 5, 2018, the contents of the applications are incorporated by reference herein in their entirety.

BACKGROUND OF THE INVENTION

Field of the Invention

The present disclosure relates generally to gaming systems, such as gaming machines and slot machines, and more specifically to display systems for gaming devices.

Description of the Related Technology

Gaming machines, such as slot machines, video poker machines, and other mechanical, electromechanical, and electronic machines used to determine and/or display wagering game outcomes have become an integral part of the worldwide gambling industry. More recently, the games historically found on gaming machines have been employed in more environments. Gaming manufacturers and/or operators are therefore constantly looking for new methods and systems to distinguish their gaming offerings.

One way to distinguish such offerings is by modifying the visual aspects of a gaming device, in order to draw interest from prospective players. However, as display technologies advance, such as curved displays on gaming machines, new and unique problems are created for manufacturers and designers. It becomes more difficult to distinguish a product offering while still maintaining reasonable assembly costs.

SUMMARY

In one embodiment of the present disclosure, a gaming device display system comprises a video display device having a curved contour portion. The gaming device display system further comprises a display frame attached to the video display device and the display frame includes a curved contour portion that conforms to the curved contour portion of the video display device. The gaming device display system further comprises a flexible light-emitting diode light strip attached to the curved contour portion of the display frame and a diffuser coupled to the display frame and positioned to allow light transmitted from the light-emitting diode light strip to be transmitted through the diffuser.

In another embodiment, a gaming device display system comprises a video display device including a curved contour portion and a flexible light-emitting diode light strip arranged in the gaming device display system to follow the curved contour portion of the video display device. The flexible light-emitting diode light strip includes a flexible substrate, a light-emitting diode coupled to the flexible substrate, and a plurality of electrical contacts positioned on the flexible substrate in which the plurality of electrical contacts are configured to communicate electrically with the light-emitting diode via the flexible substrate. The gaming system further comprises an electrical cable including a plurality of electrical lines in which each of the plurality of electrical lines include an electrical terminal contacting a respective one of the plurality of electrical contacts of the flexible light-emitting diode light strip, and an electrical cable harness covering at least a portion of the plurality of electrical lines. The gaming device display system further comprises one of a sealant sealing the plurality of electrical contacts and the electrical terminals to prevent static discharge, or a cover positioned substantially on or around the plurality of electrical contacts and the electrical terminals to prevent static discharge.

In another embodiment, a gaming device comprises a video display device including a curved contour portion and a flexible light-emitting diode light strip arranged in the gaming device to follow the curved contour portion of the video display device. The flexible light-emitting diode light strip includes an electrical ground. The gaming device further comprises a power supply having an electrical ground and configured to supply power to the gaming device. The electrical ground of the power supply and the electrical ground of the flexible light-emitting diode light strip are electrically connected at a common electrical ground connection point.

Other embodiments are described herein and/or will be apparent from the present disclosure.

Figure 1:
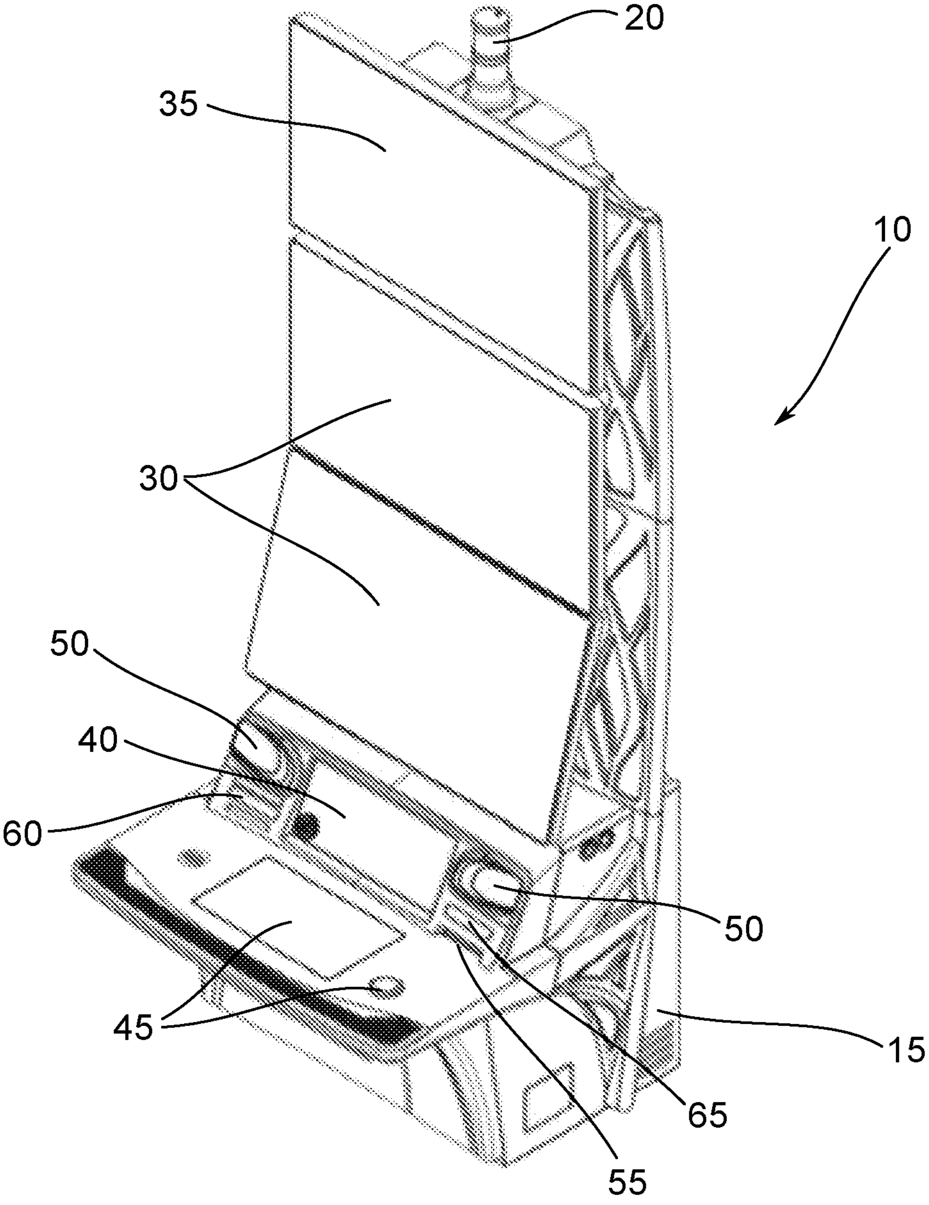
FIG. 1 is a perspective view of a gaming machine, in accordance with an embodiment of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples consistent with the description; however, the description is not limited to the examples provided in the drawings.

DETAILED DESCRIPTION OF CERTAIN INVENTIVE EMBODIMENTS

Referring to FIG. 1, a gaming machine 10 according to an embodiment of the present disclosure is shown. Gaming machines are sometimes referred to as gaming systems, slot machines, electronic gaming machines (EGM's), poker machines, pokies, video lottery terminals (VLT's), gaming terminals, video slot machines, and video gaming machines, and all such machines typically operate in a similar manner in that a player places something of value at risk on an outcome that is unknown and uncertain to the player, and the machine displays the associated outcome, thereby informing the player of the resolution associated with their placing said something at risk.

Gaming machine 10 includes a cabinet 15 which typically houses sensitive components of the gaming machine 10. Cabinet 15 can be made from wood, metal, or any other structurally secure material. In the present disclosure, it is contemplated that metal cabinets provide added benefits of limiting extrinsic electrical noise which may interfere with the operation of LED light strips, as further discussed herein. The sensitive components housed within the cabinet could include electronics, money handling devices, computing devices, communication devices, and other such components that a gaming machine manufacturer does not wish public access to.

Gaming machine 10 is shown in FIG. 1 with a candle 20. Such candles can be utilized by casinos to communicate machine malfunctions or other issues associated with gaming machine 10 to floor personnel who attend to the casino floor. Typically, dependent on the issue with the gaming machine 10, the candle 20 can be light up in different colors, which help floor personnel discern what the issue is with the gaming machine 10.

Gaming machine 10 has one or more primary displays 30, which are utilized to display the primary game. The primary game display can be a mechanical or electromechanical display, such as a set of physical reels, or it can be a video display, such as a liquid crystal display (LCD), a plasma display, an electroluminescent (EL) display, an organic light-emitting diode (OLED) display, a cathode ray tube (CRT) display, a surface-conduction electron-emitter display (SED), a digital light projection (DLP) display, a polymer light-emitting diodes (PLED) display, an LCD projection display, any combination thereof, or any other display capable of displaying video. It is also contemplated that primary display 30 has an associated touchscreen which overlays the primary display 30, which would allow a player to touch portions of the screen in order to input selections or other commands. Use of such touchscreens are common on gaming machines.

It is further contemplated that primary display 30 can be a traditional 2-D display, or a 3D display. It is also contemplated that in combining two or more displays into primary display 30, that at least the display closest to the player would have portions which are transparent or translucent in order to enable viewing of a display further from the player. In one example of such an embodiment, the display closest to the player is an LCD display, which is aligned in front of mechanical reels, which together provides a player with the experience of both video and traditional mechanical reels in a play of the gaming machine 10. In another example of such an embodiment, two or more LCD displays are provided, which can be utilized to present a 3-D display to the player.

Gaming machine 10 also includes a secondary display 35, which can be the same type of display as primary display 30, or can be any other type of display as identified above in relation to the primary display 30. Secondary display 35 can be utilized to provide information to the player, such as paytable information or information on a particular bonus game, or it can be utilized to play a portion of a game, such as a bonus game. It is also contemplated that secondary display 35 could be utilized to provide additional information related to the primary game of gaming machine 10. For example, it could display the results of the primary game, it could show the payline layout, it could identify any wins in the primary game, or any other information that a gaming machine manufacturer thinks might help the player enjoy their experience.

It is contemplated that gaming machine 10 has one or more input devices 45. Input device 45 could be utilized by a player to select components of their game, such as the amount of their wager or how to allocate their wager within the game, and allow them to initiate the play of the game, for example by selecting a "Spin" button or other play initiating button. It is contemplated that input device 45 can be physical buttons or virtual buttons, such as a touchscreen input, or a combination thereof. In one embodiment, input device 45 include video displays, such as an LCD, which in turn allows the gaming machine 10 to be converted to a different title or style of game without having to replace physical buttons.

Gaming machine 10 also includes speakers 50. It is contemplated that speakers 50 can work independently of each other, work in coordination with each other, work in coordination with other speakers, for example speakers located in a player seat associated with gaming machine 10, work as part of a surround sound system, or any combination thereof.

Gaming machine 10 also includes a currency acceptor 55. In one embodiment, currency acceptor 55 is a bill acceptor which accepts paper money. In another embodiment, currency acceptor is a coin acceptor which accepts coins. In still another embodiment, gaming machine 10 includes more than one currency acceptor 55. In another embodiment, currency acceptor 55 can accept multiple denominations of currency, or even currencies from multiple countries. In still another embodiment, currency acceptor can accept a ticket or similar physical indicium that is distributed by a casino or another gaming machine, which indicates an amount of currency available for use on gaming machine 10. In a further embodiment, currency acceptor 55 can accept credit cards, debit cards, or other instruments to initiate an electronic funds transfer. It is also contemplated that instead of a currency acceptor 55, the gaming machine 10 provides another means to allow a player to access money in order to wager on a play of the game. For example, the player may enter a PIN in order to access an account they have, either with a bank or the casino itself, and upon entering the PIN and other information, certain amount of funds are transferred to the gaming machine 10 or otherwise allowed to be wagered via gaming machine 10.

The gaming machine 10 of FIG. 1 is also shown with a ticket printer 60, which is utilized to cash money out of gaming machine 10. It is common now that gaming machines accept currency, but will only provide a ticket upon cashout, and then the holder of the ticket must take the ticket to the cashier's cage or a ticket redemption kiosk in order to obtain the currency indicated by the ticket. For gaming machine 10, it is contemplated that after a player elects to cashout by selecting an appropriate input device 45, printer 60 prints out a tickets which indicates the amount of currency the player elected to cashout, and the player can then take the ticket and insert it into another gaming machine, or visit a cashier's cage or a ticket redemption kiosk to exchange the ticket for currency.

Gaming machine 10 also includes a player tracking device 65. It is contemplated that gaming machine 10 could include a visibly distinct player tracking device 65, or a visually integrated player tracking device that utilizes a portion of the primary display 30 or information display 40, and associated touchscreen in order to interact with a player. In practice, a player makes their identity known to the player tracking device 65, either actively by inserting a player tracking card and/or entering a PIN into player tracking device 65, or passively by utilizing a location device, such as a radio frequency identification (RFID) or a Bluetooth device which can transmit information short distances. Thereafter, the player tracking device 65 communicates over a network with a casino tracking system to track a player's play, and potentially offer awards or other services to the player, often through the same player tracking device 65. The player tracking device 65 can also display player status information back to the player, or other information based on or otherwise related to a player's play history and/or status, including awards earned by a player. It is also contemplated that the networked player tracking device 65 can be utilized to offer other services to players, such as the ordering of drinks, or making promotional offers to a player, perhaps working in coordination with ticket printer 60 to do so.

Figure 2:
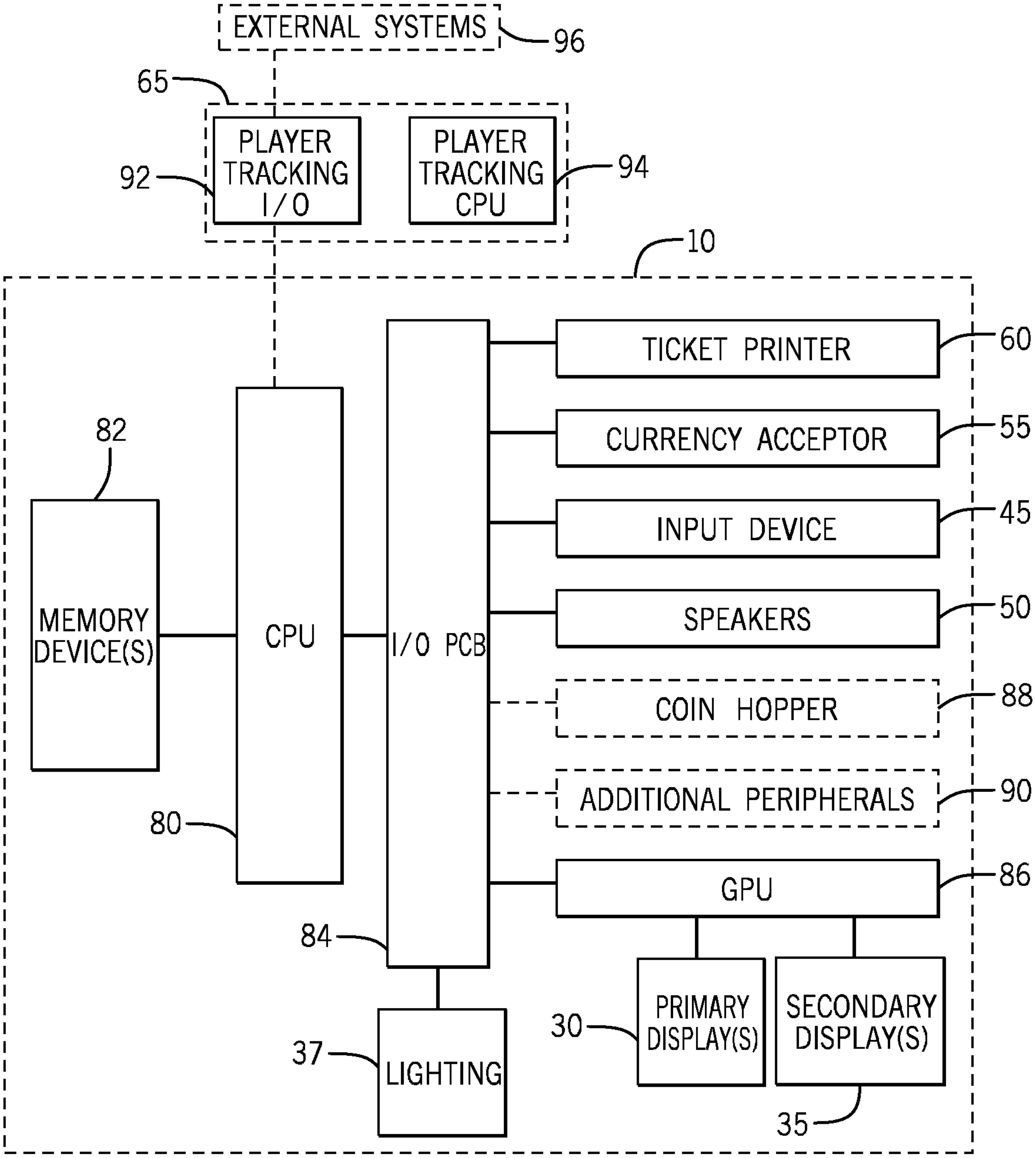
FIG. 2 is schematic view of a gaming system, in accordance with an embodiment of the present disclosure.

FIG. 2 is a schematic diagram of a gaming system in accordance with one embodiment of the present disclosure. In this embodiment, gaming machine 10 utilizes a central processing unit (CPU) 80, such as a processor, a microprocessor, or the like. CPU 80 can perform arithmetic and logical operations, and also extract instructions from memory device(s) 82 and decodes and executes them. Alternatively, it is contemplated that instead of CPU 80, an array processor or vector processor has multiple parallel computing elements, which utilizes a distributed computing model, to perform such arithmetic and logical operations. Also included with gaming machine 10 is information display 40. It is contemplated that such a smaller display could be utilized to provide condensed information to a player, such as information relating to the current play of the game. For example, information display 40 could display the number of paylines wagered on, the wager per line, and the total bet for a play of the game. Again, it is contemplated that information display could be the same type of display as primary display 30, could be a light-emitting diodes (LED) dot matrix type of display, or could be any other type of display as identified above in relation to the primary display 30. It should also be understood that while gaming machine 10 is being shown with multiple distinct displays, primary displays 30, secondary display 35, and information display 40, that more or fewer displays could be utilized without departing from the scope or spirit of the present disclosure. For example, it is contemplated that gaming machine 10 could have only a single display.

Memory device(s) 82 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood in the computing industry. In one embodiment, the memory device(s) 82 includes read only memory (ROM), which may, for example, store regulatory-sensitive instructions for gaming machine 10. In one embodiment, the memory device(s) 82 includes flash memory and/or EEPROM (electrically erasable programmable read only memory). Any other suitable magnetic, optical and/or semiconductor memory may operate in conjunction with the gaming device 10 disclosed herein.

In some embodiments, memory device(s) 82 store program code that is executable by CPU 80. Memory device(s) 82 may also store operating data, such as a random number generator (RNG), game instructions, event data, display files, game history, and other such data and instructions that allow for a gaming device 10 to properly function in a regulated environment.

CPU 80 is communicatively connected to an input/output device such as input/output printed circuit board (I/O PCB) 84 which operates as an electrical interface between CPU 80 and various peripherals of the gaming machine 10. FIG. 2 further illustrates various peripherals, including ticket printer 60, currency acceptor 55, input device 45, speakers 50, as well as possible peripherals coin hopper 88, and other additional peripherals 90. Also illustrated is a graphic processing unit (GPU) 86, which works in coordination with CPU 80 to control the primary display(s) 30 and secondary display(s) 35, and causes them to display various aspects of a game. In the present embodiment, I/O PCB also communicates with lighting 37 which may work in coordination with other displays to provide an attractive gaming device 10. Such lighting 37 may include LED light strips 420 (as illustrated in various figures herein).

Also communicatively connected to CPU 80 is a player tracking device 65. It is contemplated that the player tracking device 65 includes a distinct player tracking input/output (I/O) 92 and player tracking CPU 94, as well as associated player tracking memory (not shown). In one embodiment, it is contemplated that player tracking device 65 could have a direct line of communication with ticket printer 60. In such an embodiment, the player tracking device 65 could then cause ticket printer 60 to print out promotional tickets without having to first communicate with gaming machine CPU 80, which may be desirable from a regulatory view. FIG. 2 also illustrates that gaming machine 10 is communicatively connected to external systems 96, which could include one or more of an accounting system, player tracking system, player bonusing system, player assistance system, server-based gaming system or other game content management system, wide area network (WAN), local area network (LAN), the internet, or other communication systems.

Figure 3:
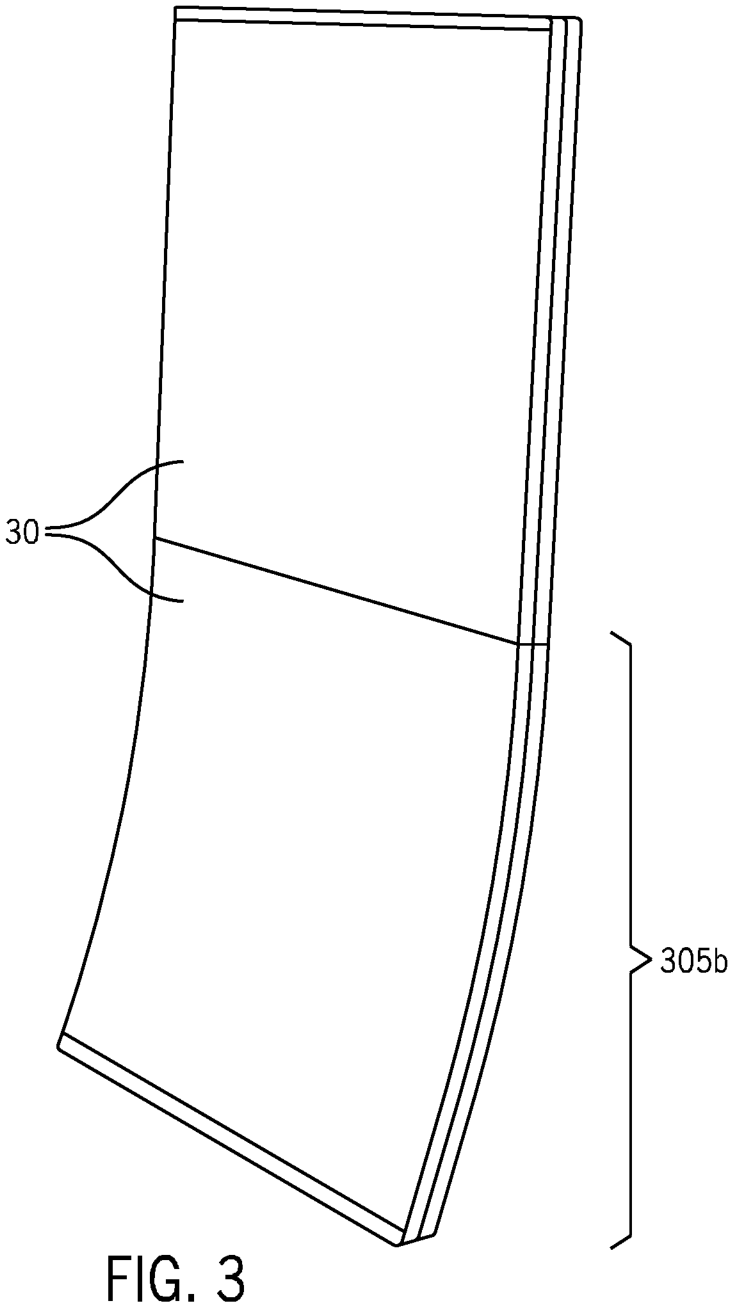
FIG. 3 is a perspective view of a display screen, in accordance with an embodiment of the present disclosure.

FIG. 3 illustrates an embodiment of the present disclosure having two primary displays 30 in which one of the primary displays 30 includes a curved contour portion or curved profile portion, generally shown at **305*b*. In this embodiment, the two primary displays 30 include a top display, and a bottom or lower display, which includes the curved contour portion 305*b*. In the embodiment of FIG. 3, the entire portion of the bottom display 30 includes the curved contour portion 305*b*. That is, the entire bottom display 30 is curved. In other embodiments, only the top display includes the curved contour portion, while in other embodiments both of the displays include the curved contour portion. In further embodiments, three or more displays may be present in which one or more of the displays includes the curved contour portion. In additional embodiments, one large display may have the curved contour portion and the entire large display may have the curved contour portion. In different embodiments, only part of one or more the displays includes the curved contour portion. For example, one or more of a right edge portion of the display, a left edge portion of the display, a middle portion of the display, a top portion of the display, and a bottom portion of the display may include the curved contour portion. It should be appreciated that the curved contour portions of the present disclosure may define any suitable curvature or profile that allows information, games or graphics to be visually observed by a player or user of the gaming devices and systems described herein. For example, in various embodiments, the curvature or contour of the curved contour portion of the display (and any other curved contour components described herein) may define one or more of a concave shape, a convex shape, a serpentine shape, a parabolic shape, a bell shape, or any other suitable curvature or curved shape. In one embodiment, the curvature or contour of the curved contour portion defines a spherical shape. In one specific example, the curved contour defines a radius of curvature of 1500 mm [correct?]. FIG. 3 illustrates an embodiment of the present disclosure having two primary displays 30 in which the entire bottom display 30 includes the curved contour portion 305***b*. While such curved displays or displays having a curved contour portion can create an attractive gaming device 10, such displays also create difficulties in construction and modification as discussed below.

Figure 4B:
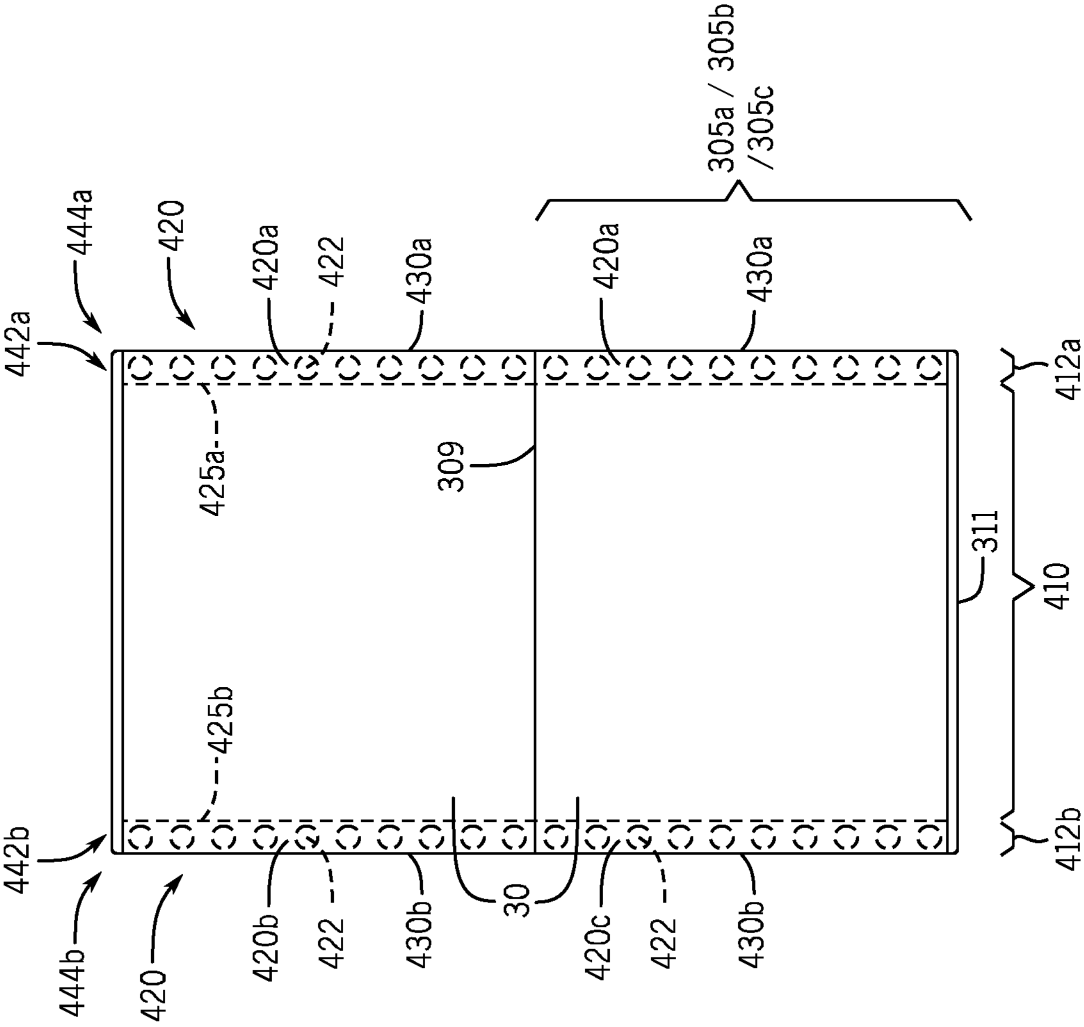
FIGS. 4A and 4B are side and front views of a curved display, respectively, in accordance with an embodiment of the present disclosure.
Figure 4A:
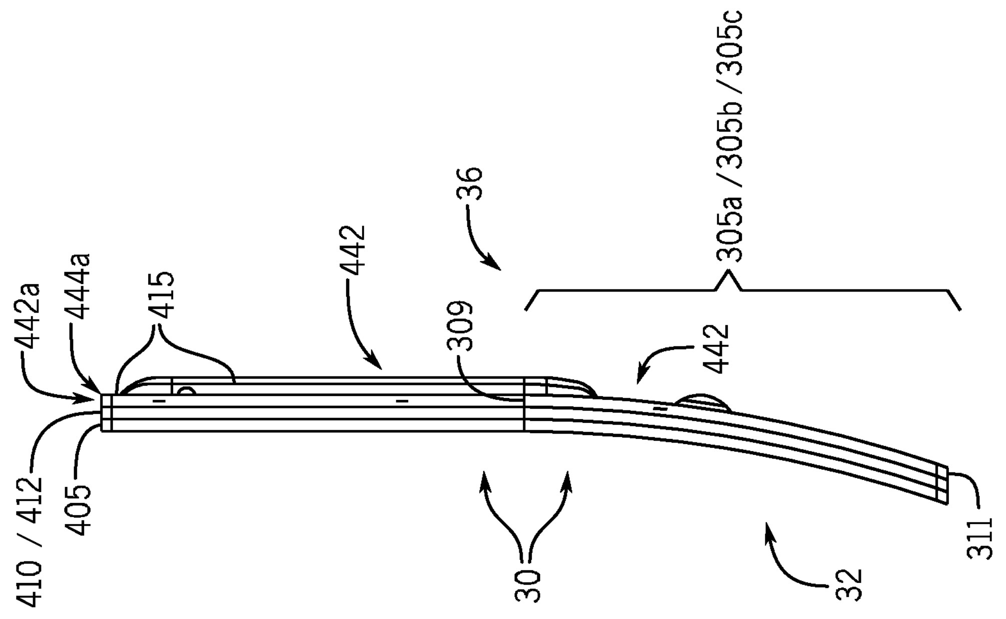

FIGS. 4A and 4B provide side and front views, respectively, of the primary displays 30 illustrated in FIG. 3A in accordance with an embodiment of the present disclosure. A front area where a player generally views primary displays 30 is illustrated generally at 32, while a rear or back area of primary displays 30 is generally illustrated at 36. In this embodiment, primary displays 30 are comprised of a touchscreen 405, a display device 410 and an LED diffuser 412 shown at the same level, and a display frame 415. Display frame 415 includes a display frame base generally indicated at 442 (also illustrated in FIGS. 5A-6B). Display frame base 442 includes a right edge portion generally indicated at 442*a* in FIGS. 4A, 4B, and a left edge portion generally indicated at 442*b* in FIG. 4B (the right edge portion 442*a* is also illustrated in FIGS. 5A-6B, while the left edge portion 442*b* is also described below with respect to its corresponding right edge portion 442*a* of FIGS. 5A-6B). Extending from right edge portion 442*a* and left edge portion 442*b* of the display frame base 442*a* are respective right frame wall 444*a* and left frame wall 444*b* as illustrated in FIGS. 4A, 4B (the right frame wall 444*a* is also illustrated in FIGS. 5A-6B, while the left frame wall 444*b* is also described below with respect to its corresponding right frame wall 444*b* of FIGS. 5A-6B). Right frame wall 444*a* and left frame wall 444*b* may in certain embodiments extend substantially perpendicularly from the respective right and left edge portions 442*a*, 442*b* of display frame base 442. As illustrated, touchscreen 405, display device 410 and display frame 415 each include a curved contour portion or profile 305*a*, 305*b*, 305*c*, respectively, which curvatures or contours are substantially the same, i.e., conform to one another. That is, display device 410 includes curved contour portion 305*b* that substantially conforms to curved contour portion 305*c* (of display frame 415) and to curved contour portion 305*a* (of touchscreen 405) such that the display device 410 is generally sandwiched between display frame 415 and touchscreen 405 via the curvatures or contours of curved contour portions 305*a*, 305*b*, 305*c* being substantially the same. In the illustrated embodiment, the curved contour portion 305*b* of the display device 410 generally extends from a top edge 309 of the lower, primary display 30 to a bottom edge 311 of lower, primary display 30, and from a right edge 425*a* of display device 410 to a left edge 425*b* of display device 410. In other embodiments, the curved contour portion 305*b* (and corresponding curved contour portions 305*a*, 305*c*) may not extend from the top to bottom or from the right edge to the left edge, and may instead only comprise a portion, or multiple portions, of the entire display 30 or display device 410. It should be appreciated that touchscreen 405 may be comprised of multiple touchscreens, or a single touchscreen. In one embodiment, touchscreen 405 may only cover one of the primary displays 30, for example, the bottom or lower display 30 closest to a player.

LED diffuser 412 may be acrylic, plastic, glass, or may be any commercially available diffuser material, and is configured to diffuse light emitted from LED lights 422 of the LED light strips 420. LED light strips 420 in this embodiment include a right LED light strip 420*a* and a left LED light strip 420*b*. The installation of LED light strips 420 is complicated and can often lead to variance in the positions of individual LED lights 422, especially in relation to the distance from the front 32 of gaming device 10 and/or a player. LED diffuser 412 advantageously allows variance in the positioning of LED light strips 420 by diffusing the light emitted from LED lights 422 so as to provide a finished display, and helps eliminate bright spots or non-uniform lighting. It should further be appreciated that LED diffuser 412 may also include a curved contour portion that conforms substantially to the curved contour portion of the display device 410, and thus likewise conforms to the curved contour portions of the touchscreen 405 and display frame 415.

FIG. 4B is an exaggerated front view of the two primary displays 30 showing LED light strips 420 positioned in a front or forward-facing direction. Front or forward-facing LED light strips may be understood as LED light strips having LED lights that generally protrude outwardly, or face in a direction, towards a player positioned at or near the front 32 of a gaming machine display such that the LED lights transmit light generally or substantially in a direction towards a player positioned at the front 32 of the gaming machine display. It should be appreciated that the display frame 415 in FIG. 4B includes curved contour portion 305*c* that conforms to the curved contour portion 305*b* of the display device 410, as illustrated in FIG. 4A. Likewise, the touchscreen 405 in FIG. 4B includes the curved contour portion 305*a* that conforms to curved contour portion 305*b* of the display device 410, as illustrated in FIG. 4A. Until now, it has been difficult to mount additional lighting, such as LED light strips, on a gaming device and have the LED light strips be forward or front-facing, especially for use in conjunction with a curved display, i.e., a display having a curved contour portion. These complications arise out of the difficulty in finding a suitable place to mount the LED light strips that protects the LED light strips while simultaneously providing an integrated look and feel to a gaming device. Rigid LED light strips may withstand harsh casino environments, but rigid LED light strips and other lighting arrangements can be difficult to place adjacent to curved displays because they are either too stiff or otherwise poorly suited to mold to or align with the curved contour of the display devices. The present disclosure uses flexible LED light strips 420 because the flexible strips are more easily positioned along the curvature or curved contour of a gaming device display.

FIG. 4A illustrates display device 410 and LED diffuser 412 generally arranged or positioned on the same or substantially the same plane. FIG. 4B illustrates respective locations of the display device 410 and LED diffuser 412, which LED diffuser 412 may be coupled to, integral with or otherwise attached to display frame 415. The embodiment of FIG. 4B illustrates LED diffuser 412 including a right diffuser 412*a* and a left diffuser 412*b*. Right diffuser 412*a* may be coupled to, integral with or otherwise attached to display frame 415 and extends generally lengthwise along display frame 415, following the arrangement of LED light strips 420, which extend generally from a top right side of the upper primary display 30 to a bottom right side of the lower primary display 30. Left diffuser 412*b* likewise is coupled to, integral with or otherwise attached to display frame 414 and extends generally lengthwise along the display frame 415, following the arrangement of LED light strips 420, which extend generally from a top left side of the upper display 30 to a bottom left side of the lower primary display 30. It should be appreciated that in other embodiments, LED light strips 420 and LED diffuser 412 may be positioned or arranged differently. For example, LED light strips 420 and LED diffuser 412 may be positioned only on the bottom portion of display frame 415 corresponding to the bottom, primary display 30, which includes the curved contour portion 305*b*. In additional embodiments, rather than having two LED lights strips 420*a*, 420*b*, a single LED light strip may be located, for example, on a left side or a right side of the display frame 415. In other examples, the LED light strips may be attached at any other suitable portions of the displays that allow the LED light strips and display devices to provide suitable viewing appearances to a player.

Display device 410 includes the right edge 425*a*, which also indicates an inside edge of right diffuser 412*a*. Display device 410 also includes a corresponding left edge 425*b*, which also indicates an inside edge of left diffuser 412*b*. Right diffuser 412*a* and left diffuser 412*b* also include corresponding outside edges 430*a* and 430*b*. In one embodiment, touchscreen 405 has right and left edges that extend to substantially the same edges as right and left LED diffuser outside edges 430*a*, 430*b*. As indicated in FIG. 4B, each of the right diffuser 412*a* and left diffuser 412*b* extends generally inwardly to the right edge 425*a* and left edge 425*b*, respectively, of display device 410 thereby covering, from a player's perspective, right and left LED light strips 420*a*, 420*b* so that LED light strips 420*a*, 420*b* are both forward-facing and protected. LED diffusers 412*a*, 412*b* provide added functionality in blurring the images of individual LED lights 422 from the LED light strips 420*a*, 420*b*.

It should be appreciated that the LED light strips 420 are exaggerated in size to illustrate the present embodiment. It is contemplated that LED light strips 420 comprise any commercially available LED light strip that is sufficiently durable enough for rigorous gaming environments. LED light strips 420 may comprise single-color LED light, multi-colored LED lights, alternating single-colored LED lights, or variations thereof. LED light strips 420 may be attached, for example, to the display frame 415 via a mechanical fastener, tape strip material, magnetic strip material, glue, or any other suitable attachment method. In one embodiment, LED light strips 420 have a width between 5 mm and 15 mm. In another embodiment, LED light strips 420 have a width of 10 mm. In a further embodiment, the distance between the right or left edges 425*a*, 425*b* of display device 410 and the respectively outside edges 430*a*, 430*b* of right and left diffusers 412*a*, 412*b* is 15 mm wider than the width of the respective right and left LED light strip 420*a*, 420*b*. In another embodiment, such width is 150% wider than the width of the LED light strip 420. LED light strip 420 may be a rigid light strip, formed to match the curvature of the curved display. It is contemplated that the LED light strip 420 is flexible to allow for easier assembly. In one embodiment, a control board (discussed below) is included to control lighting aspects of the LED light strip.

Figure 5A:
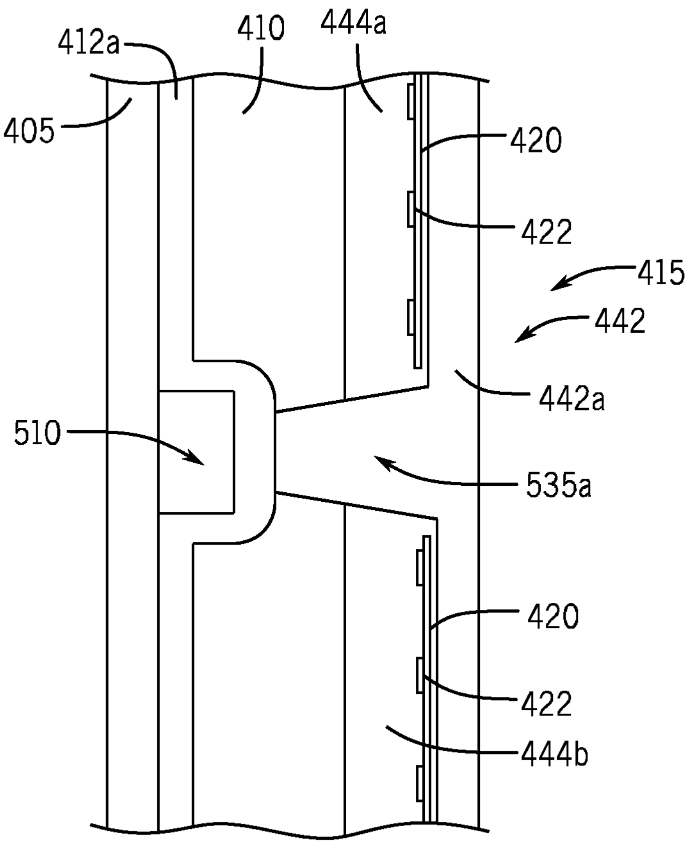
FIGS. 5A and 5B illustrate an attachment configuration for a display, in accordance with an embodiment of the present disclosure.
Figure 5B:
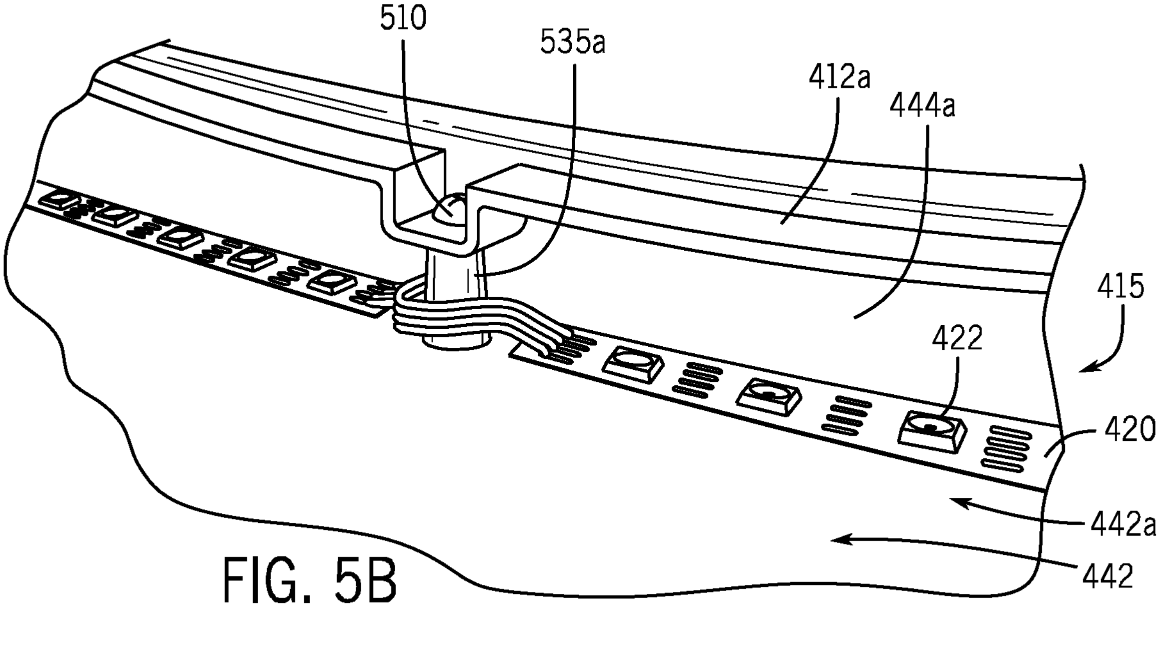

FIGS. 5A, 5B illustrate an embodiment for mounting LED diffuser 412 and touchscreen 405. FIG. 5A shows a right side view, while FIG. 5B shows the same embodiment as FIG. 5A in a perspective view. FIGS. 5A, 5B generally show a right edge portion 442*a* of display frame base 442 and right diffuser 412*a*. Display frame 415 is attached to, or otherwise holds the display device 410 in position for the overall display. As shown, a right display frame wall 444*a* extends from display frame right edge portion 442*a*. In an embodiment, right frame wall 444*a* extends substantially perpendicularly from display frame right edge portion 442*a*. An attachment structure 535*a*, e.g., a boss, extends from, is integral with, or is otherwise coupled to the right edge portion 442*a* of the display frame base 422 and is configured to attach right diffuser 412*a* to right edge portion 442*a* of display frame base 422 and attach the touchscreen 405 to the overall display. Right LED light strip 420*a* is attached or coupled to right edge portion 442*a* of the display frame base 422. Right LED light strip 420*a* is positioned facing towards the front 32 of the gaming machine display, where the player is typically positioned, so that light emitted from the right LED light strip 420*a* is transmitted or beamed through the right LED diffuser 412*a* generally to the front 32 of the display. Attachment structure 535*a* allows attachment from an attachment point 510 of LED diffuser 412*a*. Such attachment, in one embodiment, may be accomplished with any suitable mechanical fastener such as a screw or a nail. In certain examples, the mechanical fastener includes a plastic fastener such as plastic screw. It should be appreciated that like elements may be found on a left side view corresponding to the right side view of FIGS. 5A, 5B. For example, a corresponding left side view includes left edge portion 442*b* of display frame base 442, left display frame wall 444*b*, left diffuser 412*b*, and left LED light strip 420*b*.

While the embodiment illustrated in FIG. 5A provides a strong attachment of the LED diffuser 412 to the display frame 415 due to the configuration of attachment structure 535*a*, e.g., being substantial in size, it also requires an interruption or discontinuity in the securement or attachment of the right LED light strip 420*a* along the length of display frame 415. In certain embodiments, right LED light strip 420*a* may be squeezed between the attachment structure 535*a* and the right display frame wall 444*a*, or lighting components may be removed to leave minimal wiring attachments, but those embodiments may produce undesirable lighting effects or early failure due to pinching of the LED light strip 420.

Figure 6A:
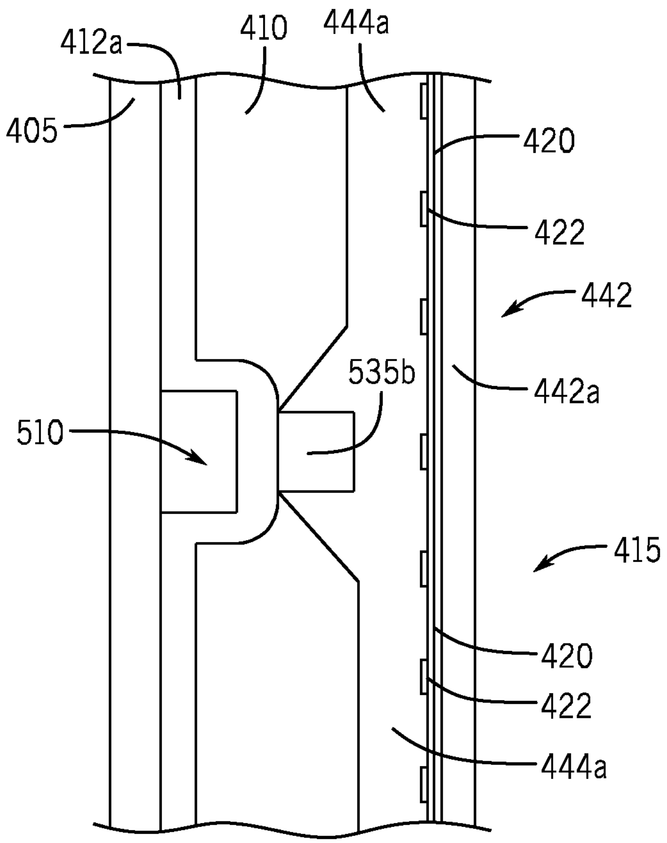
FIGS. 6A and 6B illustrate an attachment configuration for a display, in accordance with an embodiment of the present disclosure.
Figure 6B:
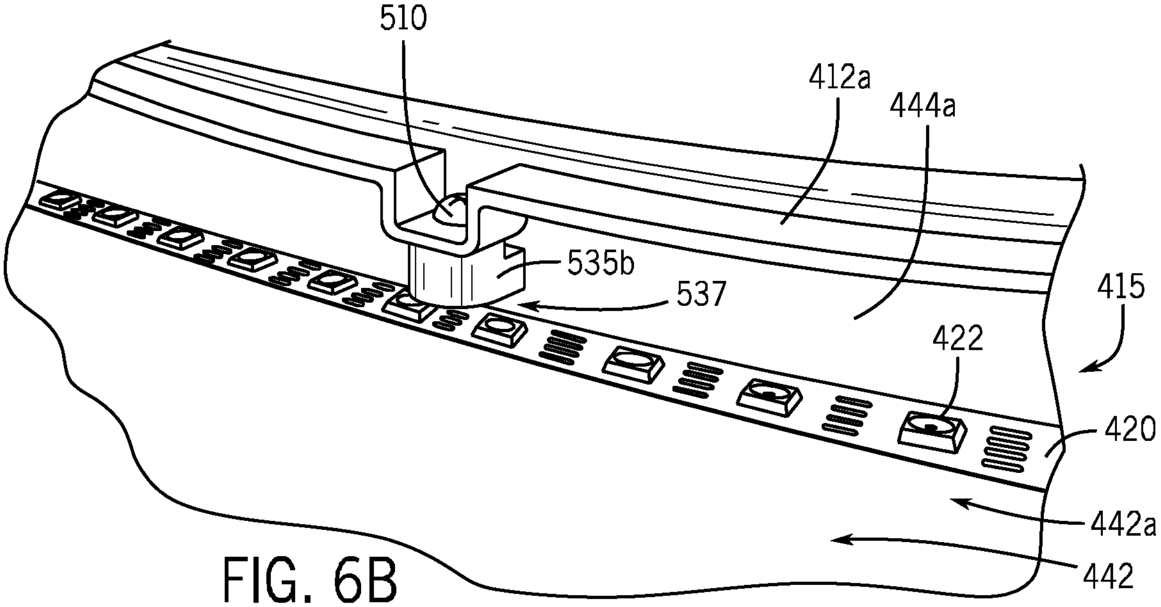

FIGS. 6A, 6B illustrate another embodiment for mounting LED diffuser 412 and touchscreen 405 that addresses the interruption or discontinuity problem in the attachment of the LED light strips 420 described with respect to FIGS. 5A, 5B. It should be appreciated that that display device 410, display frame 415 and touchscreen 405 shown in FIGS. 6A, 6B also include their respective curved contour portions that conform to one another as illustrated and discussed above. In the embodiment of FIGS. 6A, 6B, instead of the right edge portion 442*a* of the display frame base 422 having attachment structure 535*a*, the right display frame wall 444*a* has an attachment structure 535*b*, e.g., a boss. Attachment structure 535*b* extends from, is integral with, or is otherwise coupled to the right display frame wall 444*a*. Attachment structure 535*b* allows attachment from an attachment point 510 of LED diffuser 412*a*. Such attachment, in one embodiment, may be accomplished via any suitable mechanical fastener such as a screw or a nail. In various examples, the mechanical fastener includes a plastic fastener such as plastic screw. The configuration of FIGS. 6A, 6B allows right LED light strip 420*a* to be arranged without interruption or to otherwise be continuous, e.g., to be attached continuously along the right edge portion 442*a* of the display frame base 442. The attachment structure 535*b* in this embodiment does not extend all the way to the right edge portion 442*a* of the display frame base 442 and instead includes a space or void 537 between the attachment structure 535*b* and the right edge portion 442*a* of the display frame base 442. The space or void 537 allows LED light strip 420*a* to be attached continuously along the display frame base 422 by passing or extending through the space 537. This arrangement allows for an easier assembly of primary displays 30 while creating a better looking and functional lighting effect. It should be appreciated that like elements may be found on a left side view corresponding to the right side view of FIGS. 6A, 6B. For example, a corresponding left side view includes left edge portion 442*b* of display frame base 442, left display frame wall 444*b*, left diffuser 412*b*, and left LED light strip 420*b*.

FIGS. 5A-6B generally illustrate a right side view of primary displays 30, but it should be appreciated that in various embodiments, such elements would be covered from a player's view. For example, a protective plastic material may be placed to seal such areas, to prevent dust, smoke, or other debris and/or contaminants from exposure to at least LED light strip 420. In another example, LED diffuser 412 is configured to wrap LED light strip 420 and provide a seal against display frame 415. Such a configuration provides the added functionality of diffusing light to the side of primary display 30. It is contemplated that casino environment can be harsh on gaming machine parts, and/or that some people may look for any access points to gaming device components, so it is beneficial to seal or otherwise hide such components from such threats.

It should be appreciated from the foregoing that by providing front or forward-facing flexible LED lighting elements on curved gaming device display, the excitement and delivery of important gaming information to a player can be increased. Such forward-facing flexible LED lighting elements can increase the enjoyment games by providing lighting effects in conjunction with game events and valuable game information to a player (e.g., highlighted game events), which the player may otherwise be unaware. Such LED lighting elements can also provide valuable appreciation to both gaming device players and to gaming operators.

Figure 7:
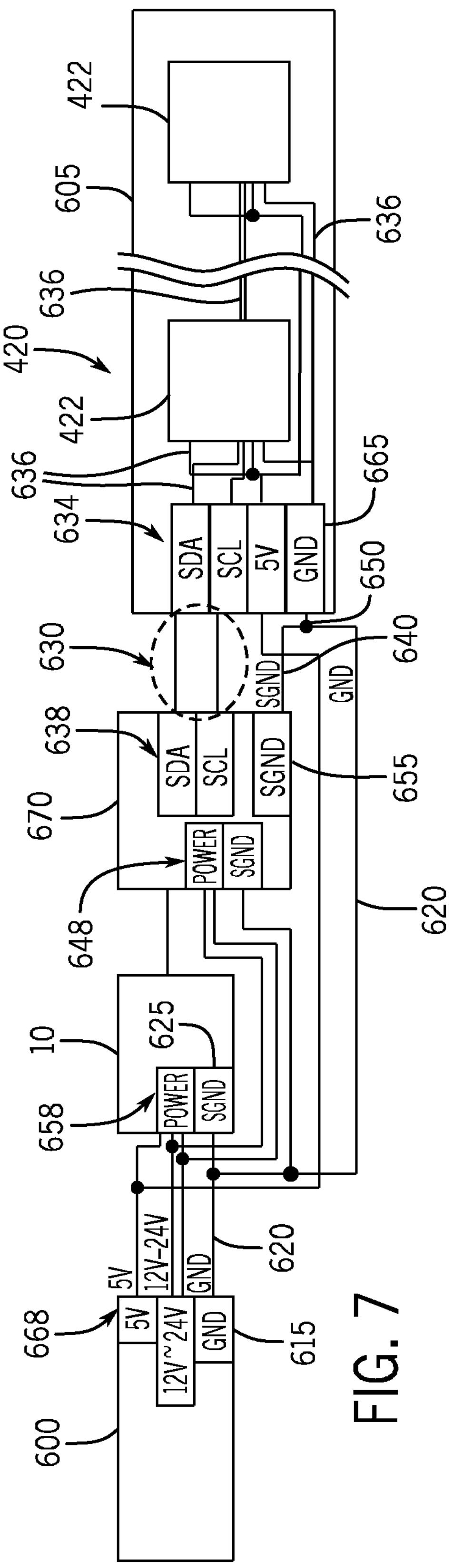
FIG. 7 is a schematic view of an LED light strip arrangement, in accordance with an embodiment of the present disclosure.
Figure 8:
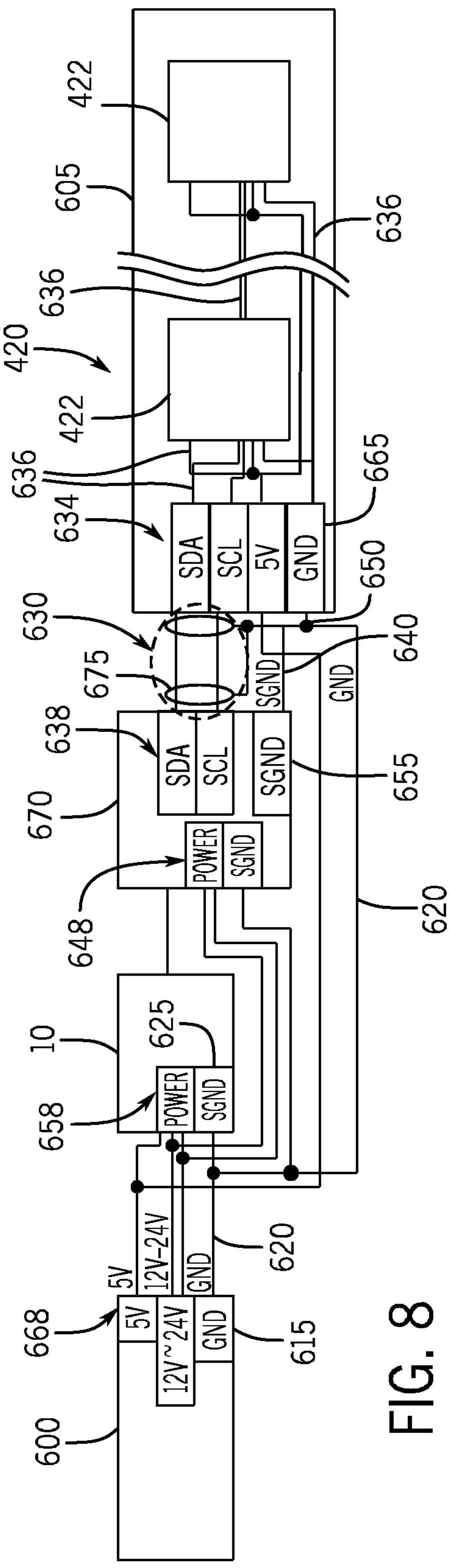
FIG. 8 is a schematic view of an LED light strip arrangement, in accordance with an embodiment of the present disclosure.

In further embodiments of the present disclosure, flexible LED light strips 420 are comprised of gain control flexible LED lighting arranged in serial communication. Flexible LED light strips 420 configured in such an arrangement, however, can be sensitive to electrical noise due the LED light strips 420 having a thin flexible substrate. A decay in the signal(s) controlling lighting features of the LED light strips 420 can result from such noise. FIG. 7 illustrates one embodiment for addressing this problem in which a ground of the flexible LED light strip 420 is directly connected to a ground of a power supply 600. FIG. 8 illustrates another embodiment for addressing the problem in which a ground shield 675 covers or surrounds one or more signal line(s) 630 that provide control signal(s) to the flexible LED light strip 420. The ground shield 675 may be connected to a ground 655 of a control board 670 (which supplies the control signal(s) to the flexible LED light strip 420 as discussed below), and/or to a ground 665 of the flexible substrate of the LED light strip 420.

Referring more specifically to FIG. 7, FIG. 7 illustrates an embodiment of a flexible LED light strip arrangement of the present disclosure that may be used with any of the displays, gaming machines, or gaming systems described herein. In particular, FIG. 7 shows a flexible LED light strip 420 in communication with a control board or printed circuit board 670, a gaming device 10 and a power supply 600. Flexible LED light strip 420 includes a flexible substrate 605 having LED lights 422, electrical contacts 634, and electrical lines or traces 636 running along flexible substrate 605. Electrical contacts 634 include an electrical ground 665, power connection(s) and signal connection(s) in various examples. It should be appreciated that in certain embodiments, LED lights 422 may include subcomponents, such as a microcontroller and individual light elements that operate through communication via a microcontroller, e.g., pulse width modulation. Control board 670 includes first electrical contacts 638 and second electrical contacts 648. First electrical contacts 638 include an electrical ground 655, power connection(s) and signal connection(s). Second electrical contacts 648 include an electrical ground and signal connection (s). Gaming machine 10 includes electrical contacts 658, which include an electrical ground 625 and power connection(s). Power supply 600 includes electrical contacts 668, which include an electrical ground 615 and power connection(s), e.g., 5V and/or 12V-24V power connections.

Control board 670 is in electrical or signal communication with the gaming device 10, for example, via I/O PCB 84 illustrated in FIG. 2. Control board 670 may be electrically coupled to, or in signal communication with the LED light strip 420 via one or more control or signal line(s) 630. Signal lines 630 provide electrical signals from control board 670 to the LED light strip 420 for controlling functional features of LED lights 422, e.g., the amount and/or timing of any light transmitted or emitted from LED lights 422. It should be appreciated from viewing FIG. 7 that the power connections of power supply 600, gaming machine 10, control board 670 and LED light strip 420 may be electrically coupled to, or in signal communication, with each other via the unlabeled power lines illustrated in FIG. 7. Power supply 600 may supply power to the gaming device and in certain embodiments to the gaming device electronics that may be housed in the cabinet 15 of gaming machine 10.

The electrical ground 615 of power supply 600 is electrically coupled to the electrical ground 625 of the gaming device 10, e.g., the cabinet 15, via an electrical line 620. The electrical ground 615 of the power supply 600 is also electrically coupled to the electrical ground 665 of the flexible LED light strip 420 at a common electrical ground connection point 650 via electrical line 620. The common electrical ground connection point 650 between the power supply 600 and flexible LED light strip 420 reduces electrical noise that may otherwise result from a serially arranged flexible LED light strip 420, thereby preventing degradation of the control signal(s) provided from the control board 670 to the LED light strip 420. As illustrated, an electrical line 640 electrically connects the electrical ground 655 of the control board 670 to the electrical ground 665 of the LED light strip 420. Electrical line 640 is also connected at the common electrical ground connection point 650.

Referring now more specifically to FIG. 8, FIG. 8 illustrates another embodiment of a flexible LED light strip arrangement of the present disclosure that may be used with any of the displays, gaming machines, or gaming systems described herein. FIG. 8 includes many of the same components described above in connection with FIG. 7. Those components in FIG. 8 are marked with the same element numbers used in FIG. 7. The description of those elements including any alternatives discussed above with FIG. 7 apply to like element numbers in FIG. 8. The embodiment of FIG. 8 differs primarily from FIG. 7 in that an electrical ground shield 675 is applied to signal lines 630 to help reduce the effect that electrical noise can cause. The ground shield 675 covers or surrounds the one or more signal line(s) 630 and may be electrically coupled to at least one of the electrical ground 655 of control board 670 or the electrical ground 665 of flexible substrate 605. The electrical ground shield 670 may be any suitable structure or material that allows for the above electrical connections and functions to sufficiently reduce electrical noise and thereby prevent or reduce decay in the control signal(s) provided by line(s) 630. For example, the ground shield 670 may be an electrical cable comprised of one or more insulated conductors enclosed by a common conductive layer, braided strands of copper, non-braided spiral winding of copper tape, a layer of conducting polymer, or any other suitable electrical grounding shield.

Flexible LED light strips 420 are also susceptible to static electricity, a problem that can be particularly acute in casino or gaming establishments due to the dry climates where such casinos may be located and the static electricity that can be generated from floors in such establishments. Flexible LED light strips 420 are also prone to static electricity when the LED light strips 420 are positioned in close proximity to other plastic components commonly found in gaming devices. To help prevent potential damage or disruption that such static electricity can cause, the embodiments of FIGS. 9 and 10A-10D include a sealant or anti-static cover over or surrounding one or more of the electrical contacts and the electrical terminals associated with the LED light strip arrangement.

Figure 9:
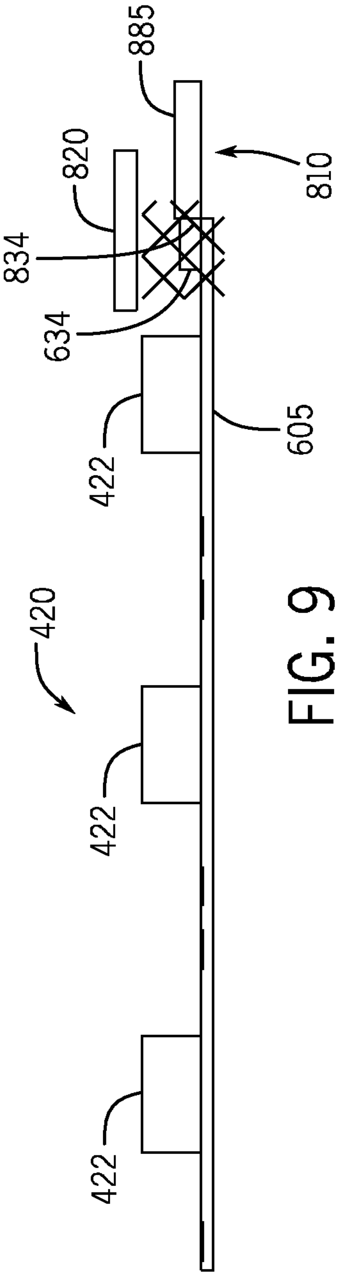
FIG. 9 is a schematic view of an LED light strip arrangement, in accordance with an embodiment of the present disclosure.

Referring specifically to FIG. 9, FIG. 9 illustrates an embodiment of a flexible LED light strip arrangement of the present disclosure that may be used with any of the displays, display systems, gaming machines, or gaming systems described herein. In particular, FIG. 9 shows a flexible LED light strip 420 that is electrically coupled to, or in electrical communication with, an electrical cable 810. Flexible LED light strip 420 includes a flexible substrate 605 having LED lights 422, electrical contacts 634, and electrical lines or traces running along the flexible substrate 605. Electrical contacts 634 include an electrical ground 665, power connection(s) and signal connection(s) in various embodiments, as described and illustrated above for example. It should be appreciated that in various embodiments, LED lights 422 include subcomponents, such as a microcontroller and individual light elements that operate through communication via a microcontroller, e.g., pulse width modulation. Electrical cable 810 includes a plurality of electrical wires or lines (not specifically shown in FIG. 9, but illustrated for example as element 895 in FIGS. 10A, 10B) and an electrical cable or wire harness 885 covering or surrounding at least a portion of each of the electrical lines. The electrical cable harness 855 may comprise any material suitable to bind the electrical lines or wires together in a bundle and may include, for example, rubber, vinyl, a weave of extruded string or combinations thereof. Each electrical line includes an electrical terminal 834 that contacts a respective one of the electrical contacts 634 of the flexible LED light strip 420. The electrical contacts 634 and terminals 834 may be electrically connected, joined or coupled in any suitable manner, such as soldering. To aid in preventing or reducing the risk of static electricity, a cover, roof or wrap 820 may be placed so as to be substantially over, around, covering, on top of, or surrounding the electrical contacts 634 and electrical terminals 834. The roof, cover or wrap 820 may comprise any suitable material and structure that aids in substantially preventing, shielding or reducing the static electricity discharge, and may be located, for example, substantially over, around, covering, on top of, or surrounding the contacts 634 and terminals 834. In certain examples, the roof, cover or wrap 820 may comprise a suitable conductive material with an electrical resistance between 1 kΩ and 1MΩ, a suitable dissipative material with an electrical resistance between 1MΩ and 1 TΩ, and/or a suitable shielding material that attenuates current and electrical fields. In certain embodiments, a sealant may be used to seal or coat the plurality of electrical contacts 634 and electrical terminals 834 to reduce the risk of static electricity discharge. The sealant may comprise any suitable material that aids in or substantially prevents static electricity discharge. In one embodiment, the sealant may be a silicone adhesive.

Figure 10A:
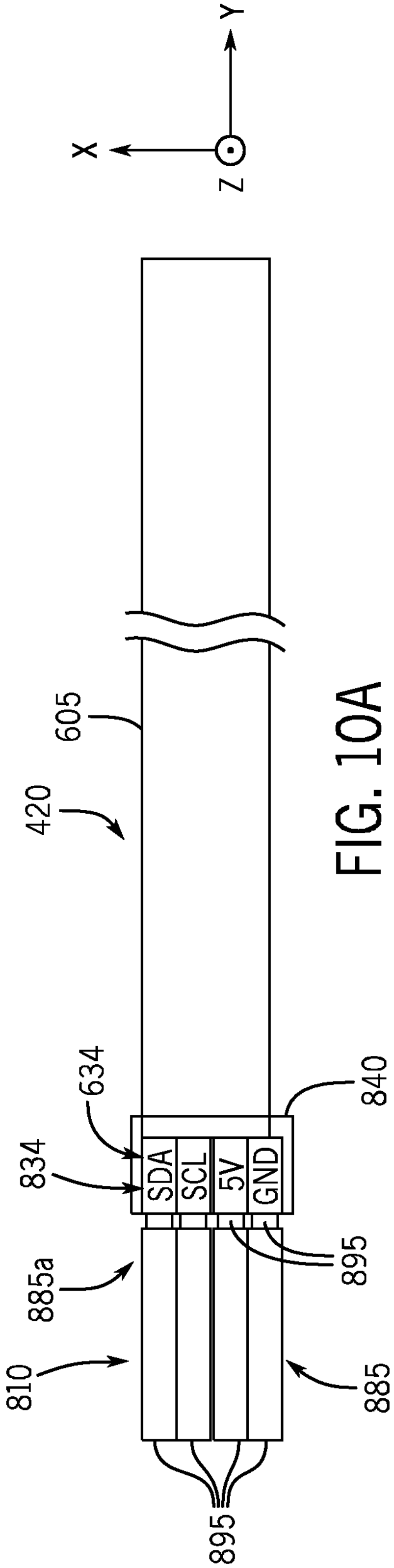
FIGS. 10A-10D are schematic views of further LED light strip arrangements, in accordance with embodiments of the present disclosure.
Figure 10B:
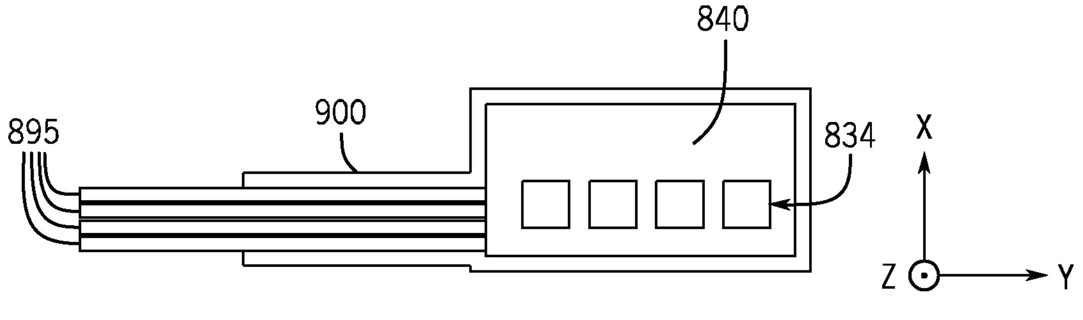
Figure 10C:
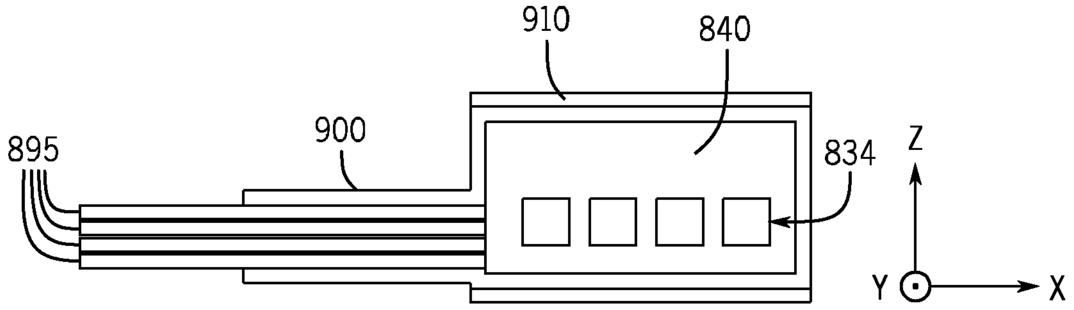
Figure 10D:
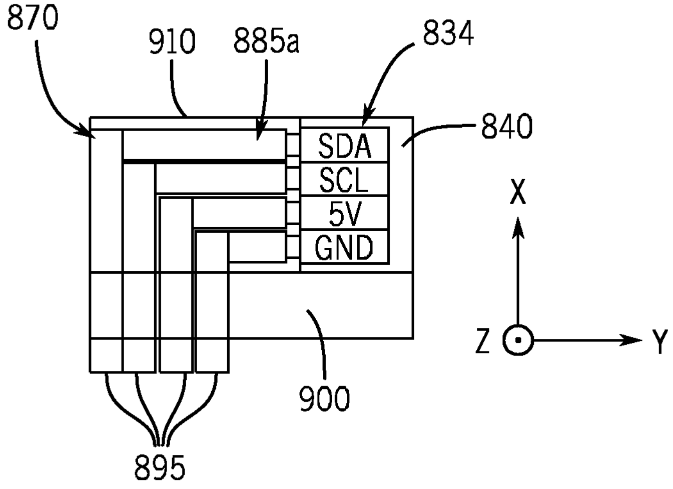

Referring now more specifically to FIGS. 10A-10D, FIGS. 10A-10D illustrate another embodiment of a flexible LED light strip arrangement of the present disclosure that may be used with any of the displays, gaming machines, or gaming systems described herein. In particular, FIGS. 10A-10D show an electrical cable 810 in electrical contact or connection with a flexible LED light strip 420 (the LED light strip 420 is shown only in FIG. 10A, while FIGS. 10B-10D show only the electrical cable 810). Flexible LED light strip 420 includes electrical contacts 634 and a flexible substrate 605. Flexible substrate 605 includes LED lights and electrical lines or traces running along the flexible substrate 605 as described above (the lights and lines are not shown here for simplicity and ease of illustration). The electrical cable 810 includes a plurality of electrical lines or wires 895 and an electrical cable or wiring harness 885 covering or surrounding at least a portion of each of the electrical lines 895. The electrical cable harness 885 may comprise any material suitable to generally bind the electrical lines or wires 895 together as a bundle and may include, for example, rubber, vinyl, a weave of extruded string or combinations thereof. Each of the electrical lines 895 includes an electrical terminal 834 that contacts a respective one of the electrical contacts 634 of flexible LED light strip 420. An electrical housing or connector 840 is connected to or coupled to an end portion 885*a* of cable 810 (end portion 885*a* is labeled in FIG. 10D) and to each electrical terminal 834 of electrical line 885, and may cover each of the terminals 834 and a portion of the harness 885. Electrical housing 840 may comprise any suitable material and structure for holding and protecting electrical terminals 834 for electrical connection or contact with respective electrical contacts 634 of flexible LED light strip 420.

To help prevent static electricity discharge, a first insulation or insulation layer 900 may be secured to and cover the electrical housing 840 and the end portion 885*a* of the electrical cable 810 that extends outwardly from the housing 840, as illustrated in FIGS. 10B-10D. First insulation 900 may further cover any gap that exposes the electrical cables, i.e., a gap located between the harness 885 and the electrical housing 840. The first insulation 900 may comprise any suitable material that prevents the free flow of electrical current under the influence of an electric charge. In one embodiment, first insulation 900 includes electrical tape comprised of an electrically insulating material such as plastic or vinyl. To further aid in preventing static electricity discharge, a second insulation or insulation layer 910 may be included in certain embodiments. Second insulation 910 may cover at least a portion of the first insulation 900, as illustrated in FIGS. 10C-10D. The second insulation 910 may likewise comprise any suitable material that prevents the free flow of electrical current under the influence of an electric charge. In one embodiment, second insulation 910 also includes an electrical tape comprised of an electrically insulating material such as plastic or vinyl. In an embodiment, electrical cable 810 (including its harness 885 and plurality of electrical lines 895) includes a bend 870. The bend 870 further reduces the likelihood of static electricity and allows the electrical cable 810 to be more easily connected to an LED light strip and positioned within physical constraints of a gaming device, e.g., along edges or corner portions of a gaming device display frame. In one example, the first insulation layer 900 and/or the second insulation layer 910 covers the bend. The bend 870 may be substantially ninety-degrees as illustrated in FIG. 10B. In other embodiments, the bend 870 may define any suitable angle that provides additional resistance to static electricity and allows the electrical cable 810 to be more easily connected to an LED light strip and positioned within the physical constraints of a gaming device.

Although the foregoing idea has been described in detail by way of illustration and example for purposes of clarity and understanding, it will be recognized that the above described idea may be embodied in numerous other specific variations and embodiments without departing from the spirit or essential characteristics of the idea. Certain changes and modifications may be practiced, and it is understood that the idea is not to be limited by the foregoing details, but rather is to be defined by the scope of the appended claims.

What is claimed is:

1. A gaming device comprising:

a video display device including a curved contour portion;

a flexible light-emitting diode light strip arranged in a sealed interior portion of the gaming device, the flexible light-emitting diode strip arranged to follow the curved contour portion of the video display device, the flexible light-emitting diode light strip including an electrical ground;

a power supply configured to supply power to the gaming device, the power supply including an electrical ground;

a control board configured to control the flexible light-emitting diode light strip, the control board including an electrical ground; and wherein the electrical ground of the power supply, the electrical ground of the flexible light-emitting diode light strip, and the electrical ground of the control board are electrically connected at a common electrical ground connection point.

2. The gaming device of claim 1, wherein the common electrical ground connection point is located at an electrical ground line connecting the control board to the flexible light-emitting diode light strip.

3. The gaming device of claim 1, further comprising a cabinet including gaming device electronics, and wherein the power supply supplies power to the gaming device electronics and to the flexible light emitting diode light strip.

4. The gaming device of claim 1, further comprising:

signal lines electrically coupling the control board to the flexible light-emitting diode light strip, the signal lines configured to provide control signals from the control board to the flexible light-emitting diode light strip.

5. The gaming device of claim 4, further comprising a ground shield surrounding the signal lines to reduce electrical noise potential.

6. The gaming device of claim 4, further comprising a ground shield surrounding the signal lines, the ground shield electrically coupled to the electrical ground of the control board or to the electrical ground of the flexible light-emitting diode light strip to reduce potential decay in the control signals provided by the signal lines to the flexible light emitting diode light strip.

7. The gaming device of claim 6, wherein the ground shield comprises one of (i) an electrical cable comprised of one or more insulated conductors enclosed by a conductive layer, (ii) braided strands of copper, or (iii) a conducting polymer.

8. The gaming device of claim 6, wherein the control board includes an electrical signal line connection.

9. The gaming device of claim 1, wherein the electrical ground of the power supply is one of a plurality of electrical contacts of the power supply.

10. The gaming device of claim 1, wherein the flexible light-emitting diode light strip comprises signal line electrical contacts and a power connection electrical contact.

11. The gaming device of claim 1, wherein (i) the video display device comprises:

a first, upper primary video display device, and a second, bottom primary video display device; and (ii) the second, bottom primary video display device includes the curved contour portion.

12. The gaming device of claim 1, wherein the flexible light-emitting diode strip is positioned behind a diffuser coupled to the curved contour portion of the video display device.

13. The gaming device of claim 1, further comprising a diffuser forming the sealed interior portion.

* * * * *